(12) United States Patent
Hanamoto

(10) Patent No.: US 9,076,266 B2
(45) Date of Patent: Jul. 7, 2015

(54) IMAGE PROCESSING APPARATUS AND METHOD THEREFOR

(75) Inventor: Takashi Hanamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 178 days.

(21) Appl. No.: 13/361,105

(22) Filed: Jan. 30, 2012

(65) Prior Publication Data
US 2012/0200570 A1   Aug. 9, 2012

(30) Foreign Application Priority Data

Feb. 9, 2011 (JP) ................................. 2011-026530
Jan. 16, 2012 (JP) ................................. 2012-006555

(51) Int. Cl.
*G06T 15/50* (2011.01)

(52) U.S. Cl.
CPC ................................... *G06T 15/506* (2013.01)

(58) Field of Classification Search
CPC ................................................... G06T 15/506
USPC ................. 345/418, 426, 427, 428, 589, 619
See application file for complete search history.

(56) References Cited

U.S. PATENT DOCUMENTS

| | | | |
|---|---|---|---|
| 4,928,250 A * | 5/1990 | Greenberg et al. | 345/426 |
| 4,947,347 A * | 8/1990 | Sato | 345/421 |
| 5,240,313 A | 8/1993 | Yoshino et al. | |
| 5,305,430 A * | 4/1994 | Glassner | 345/427 |
| 5,663,789 A * | 9/1997 | Takagi | 356/121 |
| 6,621,925 B1 * | 9/2003 | Ohmori et al. | 382/167 |
| 6,809,729 B2 * | 10/2004 | Greasley | 345/426 |
| 7,012,604 B1 * | 3/2006 | Christie et al. | 345/426 |
| 7,154,504 B2 * | 12/2006 | Abdo | 345/581 |
| 7,348,977 B2 * | 3/2008 | West et al. | 345/426 |
| 7,355,683 B2 * | 4/2008 | Sasian et al. | 356/30 |
| 7,751,034 B2 * | 7/2010 | Sasian et al. | 356/30 |
| 7,864,176 B2 * | 1/2011 | Planck et al. | 345/424 |
| 8,493,618 B2 * | 7/2013 | Ishii et al. | 358/1.9 |
| 2002/0008697 A1 * | 1/2002 | Deering | 345/418 |
| 2003/0052874 A1 * | 3/2003 | Abramov et al. | 345/418 |
| 2007/0182732 A1 * | 8/2007 | Woop et al. | 345/420 |
| 2008/0074420 A1 * | 3/2008 | Kuesel et al. | 345/426 |
| 2008/0122841 A1 * | 5/2008 | Brown et al. | 345/421 |
| 2008/0297506 A1 * | 12/2008 | Fossum et al. | 345/422 |
| 2011/0285710 A1 * | 11/2011 | Mejdrich et al. | 345/426 |

FOREIGN PATENT DOCUMENTS

| | | | |
|---|---|---|---|
| EP | 1227443 A2 * | 7/2002 | |
| JP | 04-123961 A | 4/1992 | |
| JP | 2000-172873 A | 6/2000 | |
| JP | 2003-187264 A | 7/2003 | |

OTHER PUBLICATIONS

M.L. Dias, "Ray Tracing Interference Color", IEEE CG & A., vol. 11, No. 2, pp. 54-60, Mar. 1991.

* cited by examiner

*Primary Examiner* — Jason M Repko
*Assistant Examiner* — Jitesh Patel
(74) *Attorney, Agent, or Firm* — Fitzpatrick, Cella, Harper & Scinto

(57) ABSTRACT

Based on the refractive property and/or reflectance property of an object, it is determined which one of light, spectra, and channels is to be used as a target for tracing by the ray-tracing method. A pixel value of image data representing the object is determined by tracing at least one entity of the determined target for tracing from a view point in the virtual three-dimensional space to a light source.

6 Claims, 15 Drawing Sheets

F I G. 3A
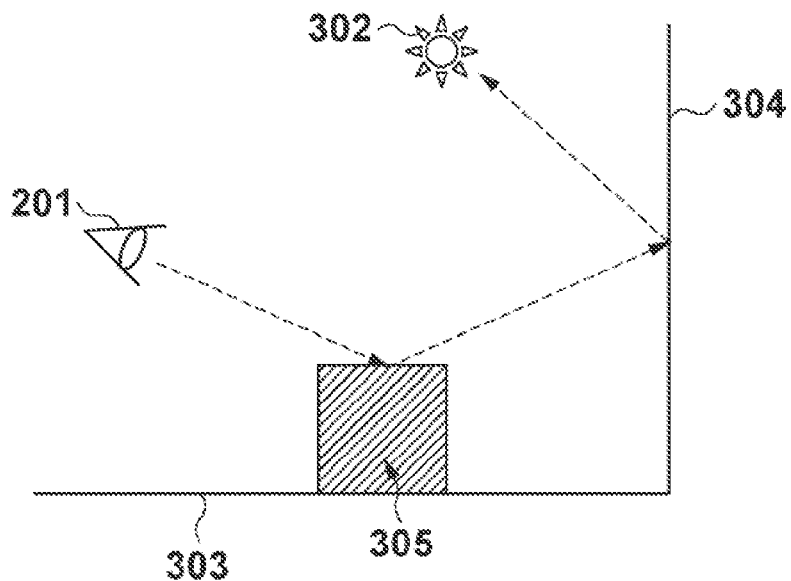
F I G. 3B
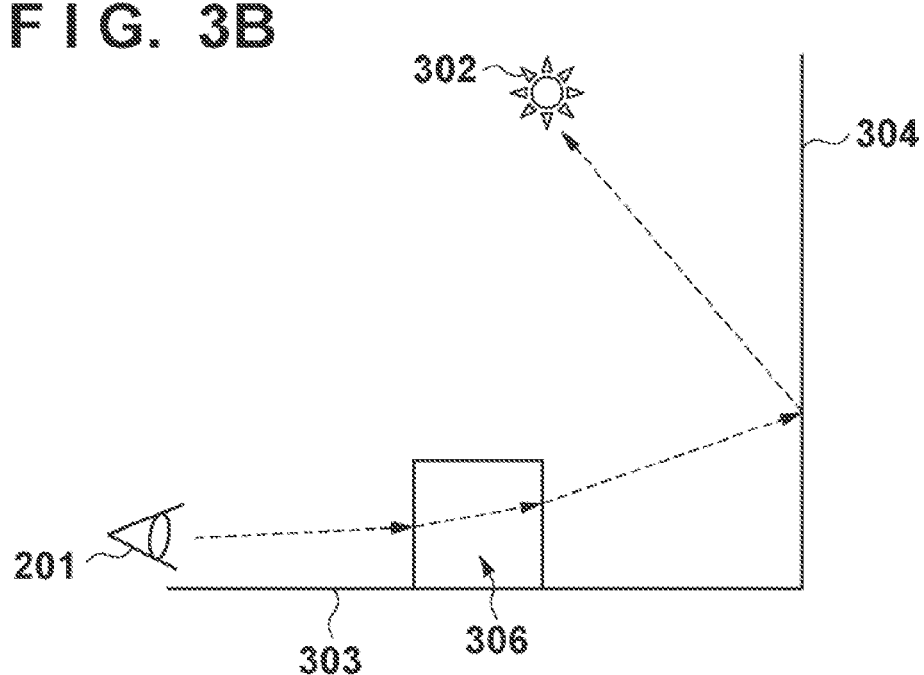

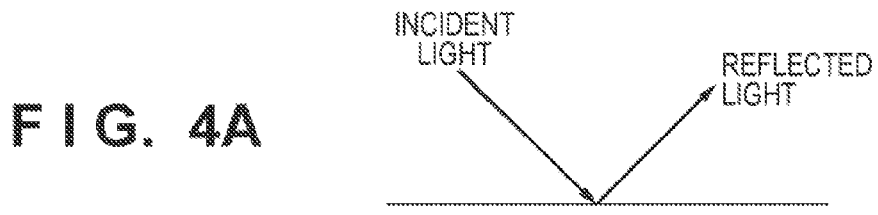
F I G. 4A
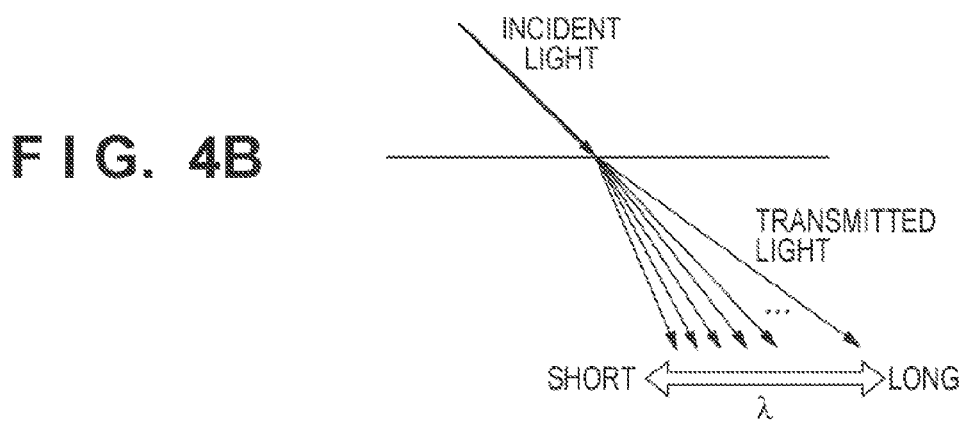
F I G. 4B
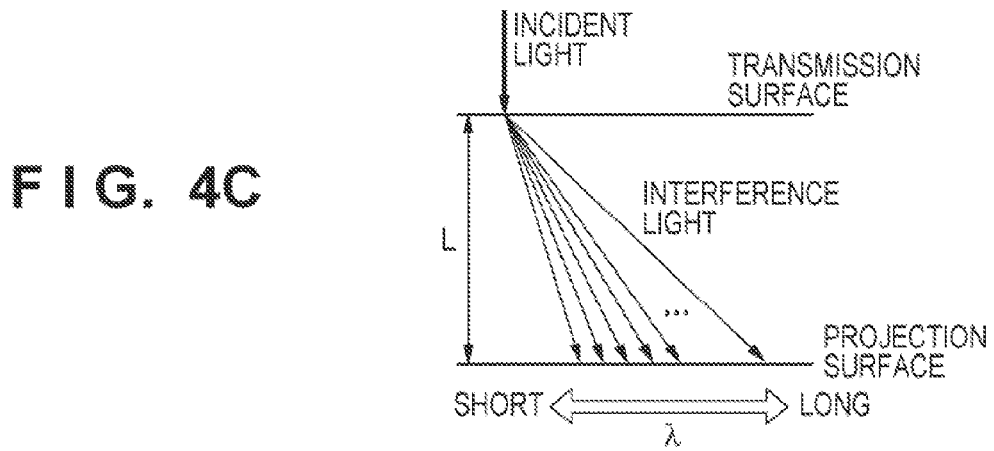
F I G. 4C
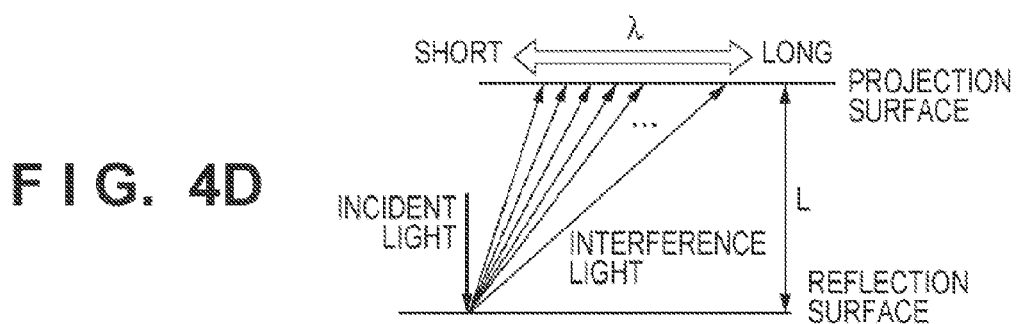
F I G. 4D

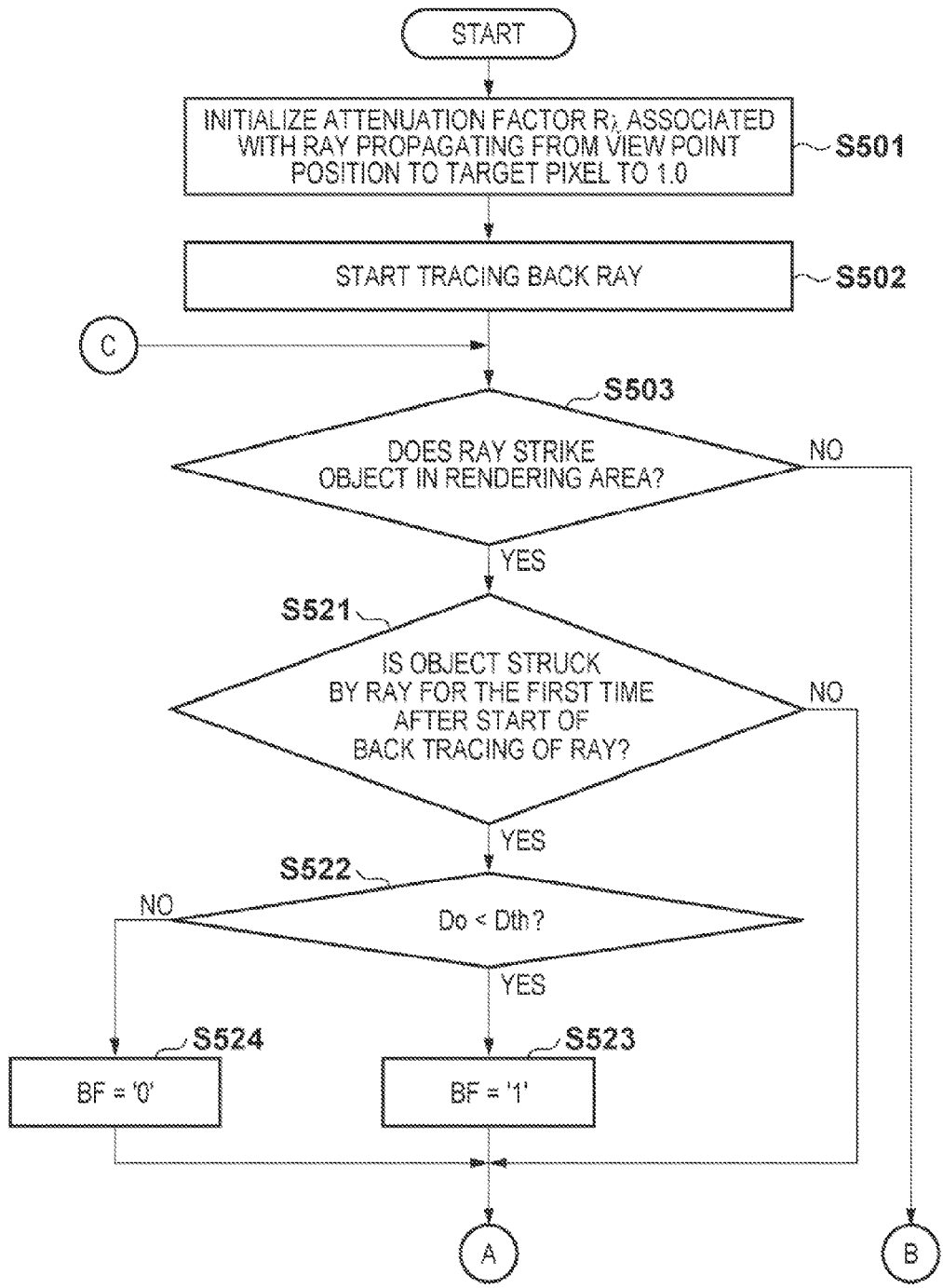

F I G. 11A
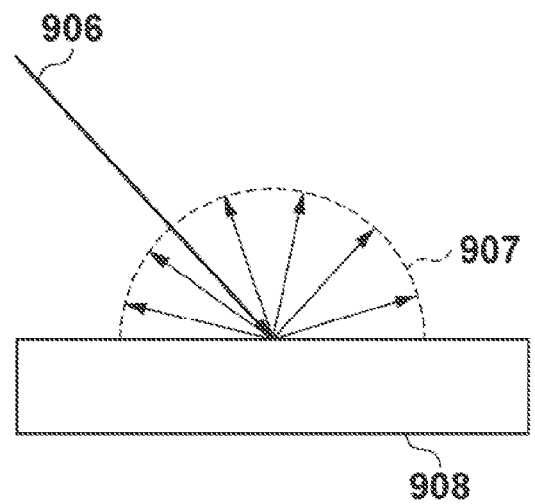
F I G. 11B
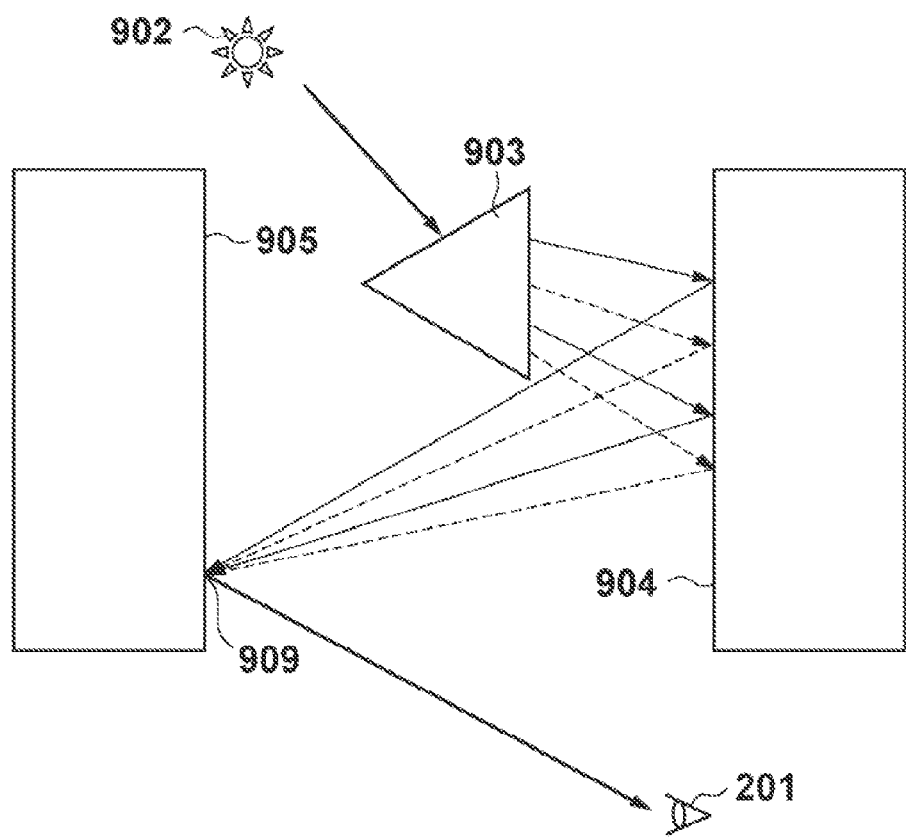

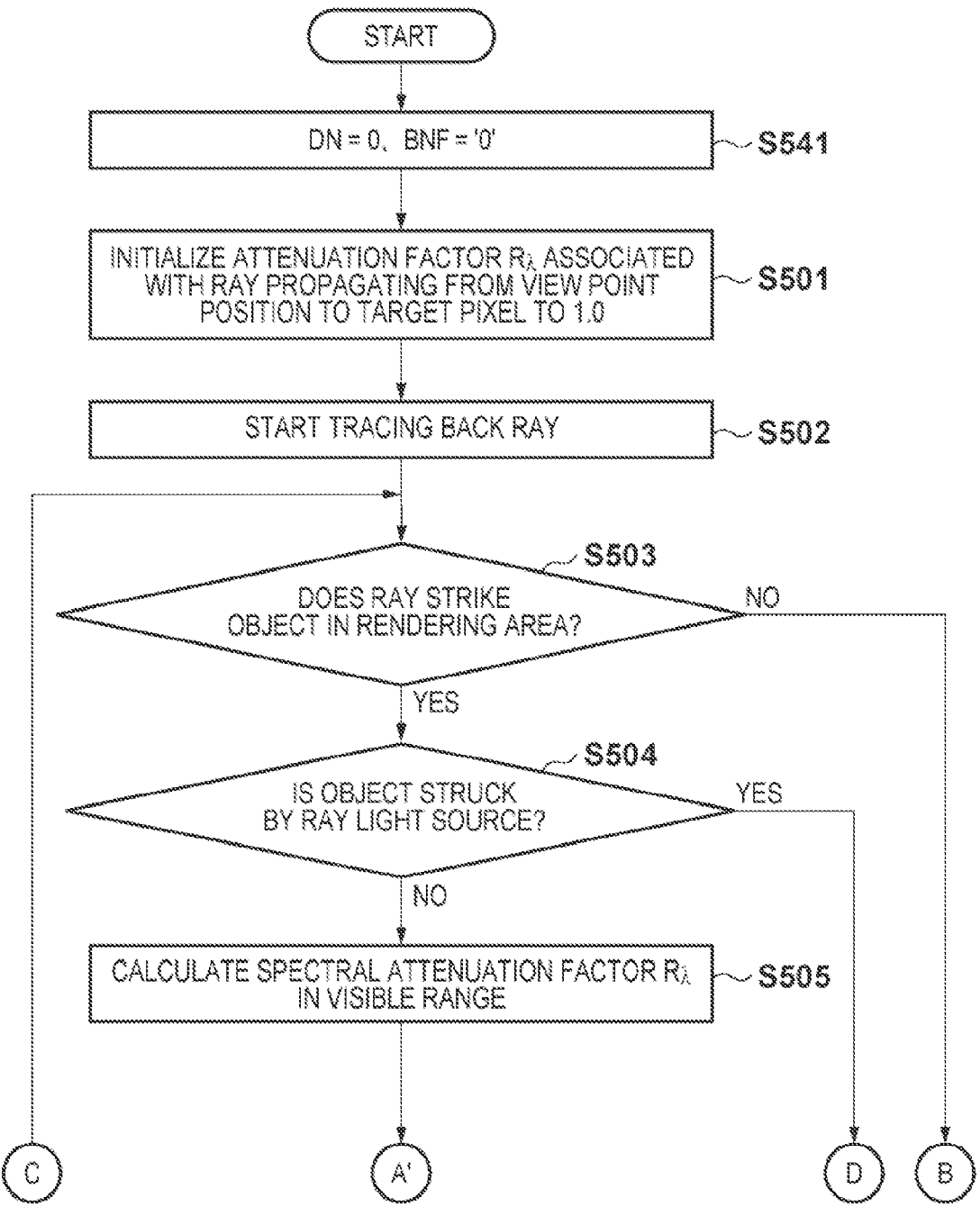

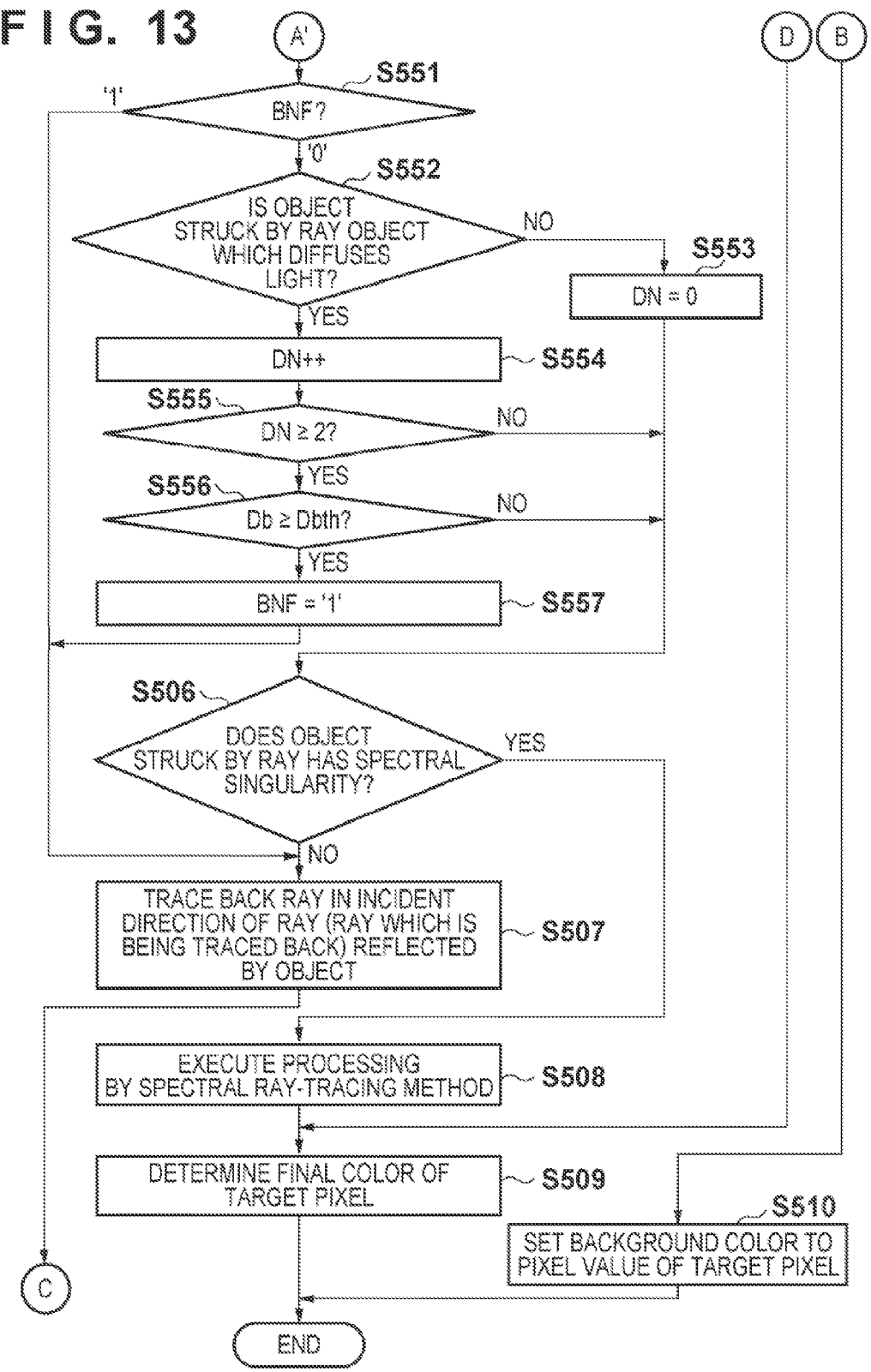

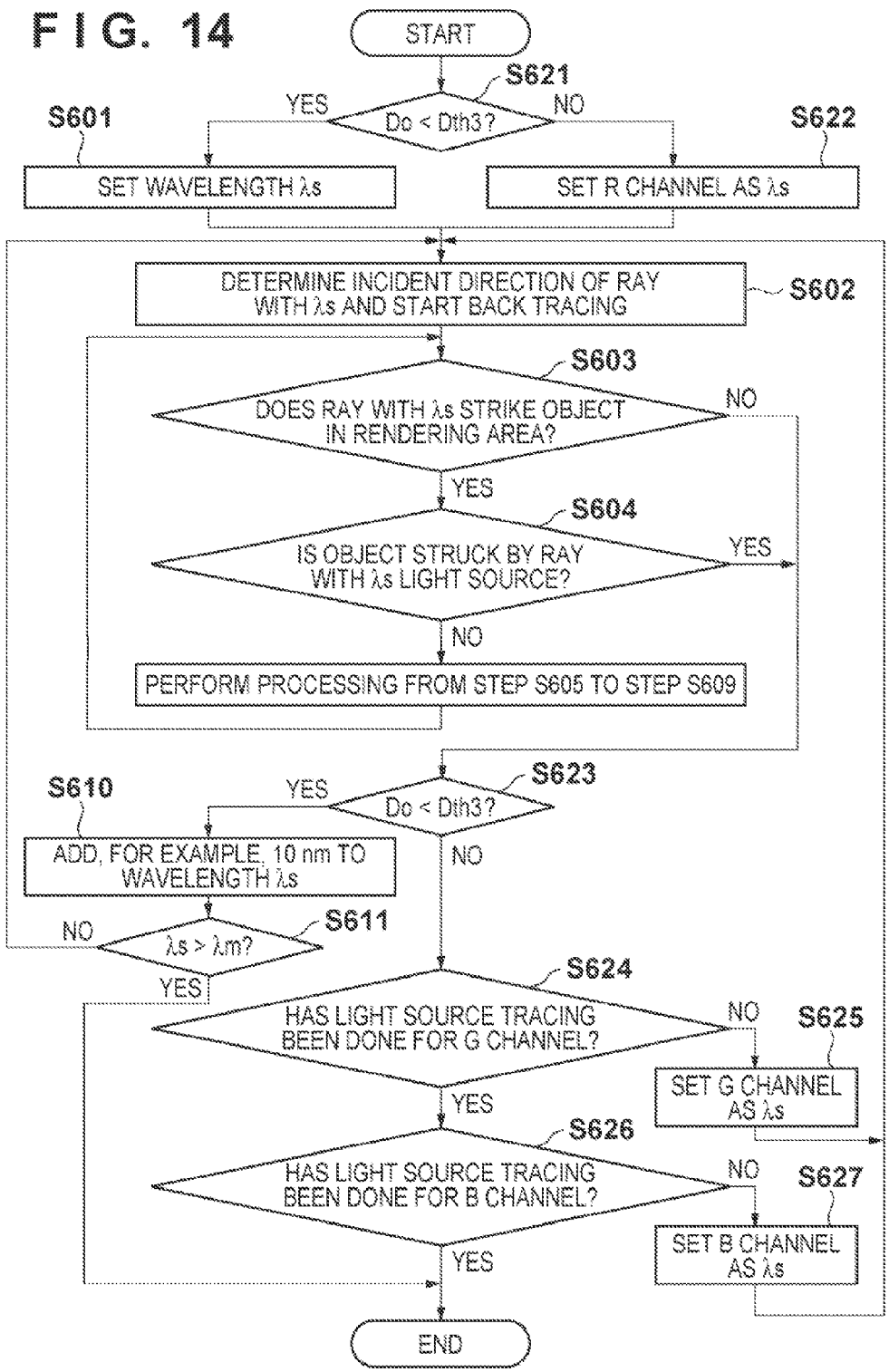

IMAGE PROCESSING APPARATUS AND METHOD THEREFOR

BACKGROUND OF THE INVENTION

1. Field of the Invention

The present invention relates to image processing for rendering an image by using a ray-tracing method.

2. Description of the Related Art

The ray-tracing method is often used in computer graphics (CG) as a means for obtaining a realistic rendering result. The ray-tracing method traces the trajectory of a ray reaching a light source by tracing back the path of the ray from a view point in the reverse direction. When tracing back a ray for every pixel to be rendered, its execution requires an enormous processing time. For this reason, there is available a technique of executing ray-tracing method for part of a rendering area.

There has also been proposed a spectral ray-tracing method which reproduces the physical behavior of light to further approximate a rendering result to an actual scene. Spectra express light and are constituted by light beams having various wavelengths. The spectral ray-tracing method can reproduce scattering by a prism, structural colors from an optical disk, the rainbow luster of pearls, and the like by tracing back a ray for each wavelength of light. In addition, there is available a technique of performing RGB display of the calculation result obtained by the spectral ray-tracing method by using color matching functions and the like.

Assume that the spectral ray-tracing method traces back a ray by performing sampling in increments of 10 nm in the wavelength range of 380 nm to 740 nm in the visible range. In this case, it is necessary to trace back a ray 36 times per pixel. That is, the processing time in the spectral ray-tracing method is at least 36 times that in the ray-tracing method, and hence it is difficult to finish the processing within a practical time.

SUMMARY OF THE INVENTION

In one aspect, an image processing apparatus for generating image data representing an object in a virtual three-dimensional space by using a ray-tracing method, the apparatus comprises: a first determiner, configured to determine, based on a refractive property and/or reflectance property of the object, which one of light, spectra, and channels is to be used as a target for tracing by the ray-tracing method; and a second determined, configured to determine a pixel value of image data representing the object by tracing at least one entity of a target for tracing determined by the first determiner from a view point in the virtual three-dimensional space to a light source.

According to this aspect, it is possible to obtain a more realistic rendering result while suppressing the processing time when rendering an image by using the ray-tracing method.

Further features of the present invention will become apparent from the following description of exemplary embodiments with reference to the attached drawings.

BRIEF DESCRIPTION OF THE DRAWINGS

FIGS. 3A and 3B are views for explaining an outline of processing by the ray-tracing method at a wavelength $\lambda$.

FIGS. 4A to 4D are views for explaining how reflected light and transmitted light behave with respect to incident light.

FIGS. 9 and 10 are flowcharts for explaining processing by the ray-tracing method in the second embodiment.

FIGS. 11A and 11B are views for explaining an outline of processing by the ray-tracing method in the third embodiment.

FIGS. 12 and 13 are flowcharts for explaining processing by the ray-tracing method in the third embodiment.

FIG. 14 is a flowchart for explaining the spectral ray-tracing method in the fifth embodiment.

DESCRIPTION OF THE EMBODIMENTS

Image processing in the embodiments of the present invention will be described in detail below with reference to the accompanying drawings.

First Embodiment

[Arrangement of Apparatus]

Figure 1:
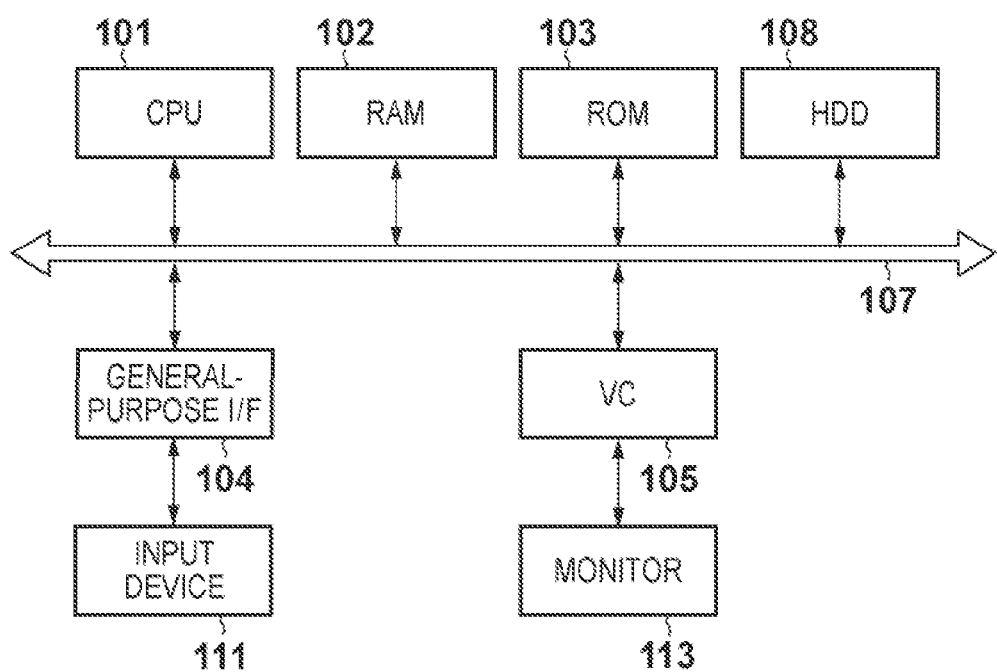
FIG. 1 is a block diagram for explaining the arrangement of an image processing apparatus according to an embodiment.

The arrangement of an image processing apparatus according to an embodiment will be described with reference to the block diagram of FIG. 1.

A microprocessor (CPU) 101 executes various kinds of programs including an operating system (OS) by using a random access memory (RAM) 102 as a work memory. These programs are stored in a read only memory (ROM) 103 or a nonvolatile memory such as a hard disk drive (HDD) 108. The CPU 101 controls the components (to be described later) via a system bus 107. The HDD 108 stores a program for implementing image generation processing (to be described later), the spectral characteristic data of a light source and object, and the like.

A general-purpose interface (I/F) 104 is, for example, a serial bus interface such as USB (Universal Serial Bus), to which an input device 111 such as a mouse or a keyboard is connected. A video card (VC) 105 is a video interface, to which a monitor 113 such as a liquid crystal display (LCD) is connected.

The CPU 101 displays a user interface (UI) on the monitor 113. The user operates the input device 111 to input instructions and data to the UI. The CPU 101 receives user instructions and data from the input device 111, and executes programs in accordance with these inputs, thereby performing various kinds of processing.

[Outline of Processing by Ray-Tracing Method]

An outline of processing by the ray-tracing method will be described with reference to FIGS. 2A and 2B.

Figure 2A:
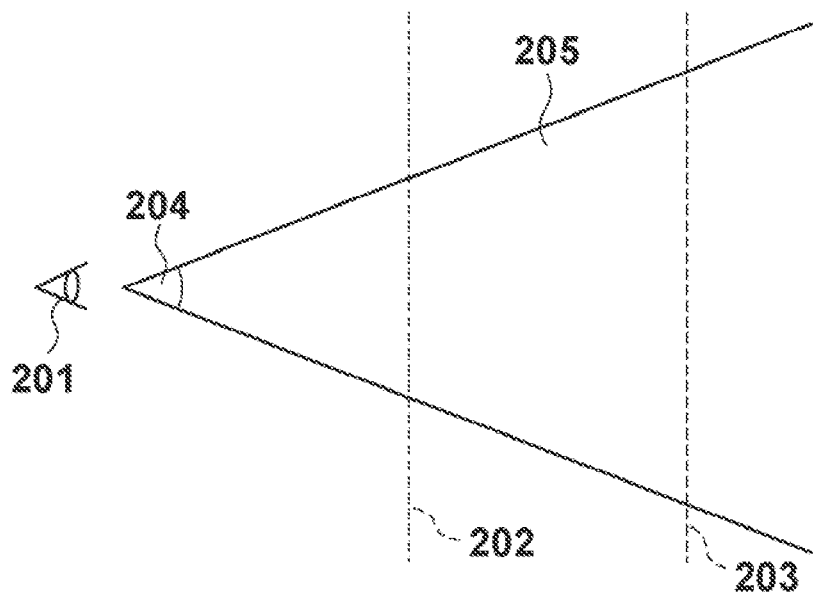
FIGS. 2A and 2B are views for explaining an outline of processing by the ray-tracing method.

As shown in FIG. 2A, at the time of rendering, a view point position (view point 201) for the observation of an image, a viewing angle 204, a front clip surface 202, and a rear clip surface 203 are determined. A trapezoidal area 205 surrounded by half lines indicating the viewing angle 204, the front clip surface 202, and the rear clip surface 203 is determined as a rendering area.

Figure 2B:
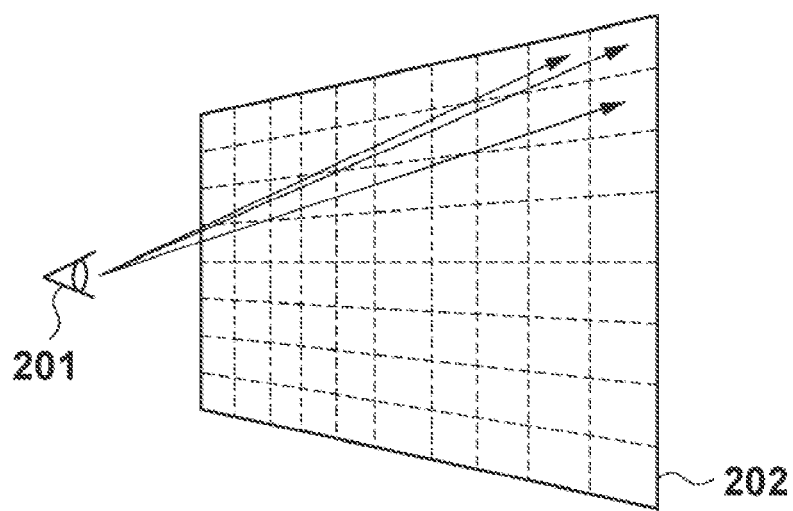

Upon determining the rendering area 205, this method traces back a ray from the view point 201 to the front clip surface 202 for each pixel, as shown in FIG. 2B. When displaying a rendering result in 800×600 cells, the method segments the front clip surface into 800×600 cells, and regards a line segment connecting the view point 201 and the center of each cell as a ray.

An outline of processing by the ray-tracing method at a wavelength $\lambda$ will be described with reference to FIGS. 3A and 3B.

FIG. 3A shows a case in which there is no transparent object in the rendering area 205. In this case, when tracing back a ray from the view point 201, the ray strikes an opaque object 305 and a wall 304 and finally reaches a light source 302. In this case, a spectral radiance $I_{E_\lambda}$ of a ray with the wavelength $\lambda$ which enters the view point 201 is approximately calculated by $$I_{E^\lambda} = k_{\lambda_{305}} \times k_{\lambda_{304}} \times L_\lambda \quad (1)$$

where $\lambda_{\lambda_{305}}$ is the reflectance of the object 305 with respect to light with the wavelength $\lambda$, $k_{\lambda_{304}}$ is the reflectance of the wall 304 with respect to light with the wavelength $\lambda$, $L_\lambda$ is the spectral radiance of the light source 302 having the wavelength $\lambda$.

Letting $k_{\lambda_M}$ be the reflectance of each object at the wavelength $\lambda$, equation (1) is expressed as follows:

$$I_{E^\lambda} = \Pi_M k_{\lambda_M} \times L_\lambda \quad (2)$$

FIG. 3B shows a case in which there is a transparent object in the rendering area 205. In this case, when tracing back a ray from the view point 201, the ray strikes a transparent object 306, is transmitted through the object 306, strikes the wall 304, and finally reaches the light source 302. In this case, the spectral radiance $I_{E^\lambda}$ of a ray with the wavelength $\lambda$ which enters the view point 201 is approximately calculated by $$I_{E^\lambda} = T_{\lambda_{305}} \times k_{\lambda_{304}} \times L_\lambda \quad (3)$$

where $T_{\lambda_{305}}$ is the transmittance of the object 306 with respect to light with the wavelength $\lambda$.

Letting $k_{\lambda_M}$ be the reflectance of each object at the wavelength $\lambda$, and $T_{\lambda_N}$ be the transmittance of the object, equation (3) is expressed as follows:

$$I_{E^\lambda} \Pi_N T_{\lambda_N} \times \Pi_M k_{\lambda_M} \times L_\lambda \quad (4)$$

As indicated by the following equation, a transmittance T and a reflectance k can be collectively expressed as an attenuation factor R.

$$R_\lambda = \Pi_N T_{\lambda_N} \times \Pi_M k_{\lambda_M} \quad (5)$$

Therefore, equations (2) and (4) can be expressed by $$I_{E^\lambda} = R_\lambda \times L_\lambda \quad (6)$$

Executing processing by the above ray-tracing method for each wavelength band (for example, a band with a wavelength step of 10 nm) in a wavelength range in the visible range can calculate the spectral radiance of light entering the view point 201. This method, however, traces back a ray at each wavelength band in a wavelength range in the visible range, and hence requires a very long processing time.

[Reflected Light and Transmitted Light with Respect to Incident Light]

The manner of how reflected light and transmitted light behave with respect to incident light will be described with reference to FIGS. 4A to 4D.

FIG. 4A shows the light reflected by a material such as an opaque plastic or rubber material. In this case, the direction of reflected light with respect to incident light remains the same at all wavelengths. That is, light of all wavelengths is reflected in the same direction, and there is no path difference between rays with the respective wavelengths. This allows to trace back one ray.

FIG. 4B shows light transmitted through a transmission material such as a transparent plastic or glass material. In this case, the direction of transmitted light with respect to incident light changes depending on the wavelength according to the Snell's law. That is, the refractive index of a transmission material changes depending on the wavelength, and hence the direction of transmitted light changes depending on the wavelength. This generates rainbow colors owing to scattering. As a result, path differences occur between rays with the respective wavelengths. This makes it necessary to trace back rays with all wavelengths.

FIGS. 4C and 4D show the transmission and reflection of light at a material which generates a structure color such as a pearl, opal, or optical disk. The production of structural colors is a color phenomenon due to the interference of light caused by a material having a structure equal to or smaller than the wavelength of light in the visible range. A typical example of such a material is a diffraction grating typified by an optical disk.

The production of structural colors is a phenomenon caused by the wave character of light. That is, light scattered by grooves smaller than the wavelength of light interferes with each other to reproduce structural colors like a rainbow. Letting d be the interval (grating constant) between the grooves and L be the distance between the transmission/reflection surface and the projection surface, a condition under which light with the wavelength $\lambda$ strikes the projection surface is given by period $D=\lambda L/d$. In other words, light with the wavelength $\lambda$ which satisfies the above condition and has passed through/has been reflected by the diffraction grating is projected on an object spaced apart by the distance L. When light passes through/is reflected by the diffraction grating in this manner, since path differences occur between rays with the respective wavelengths, it is necessary to trace back the rays with all the wavelengths.

[Image Generation Processing]

Figure 5:
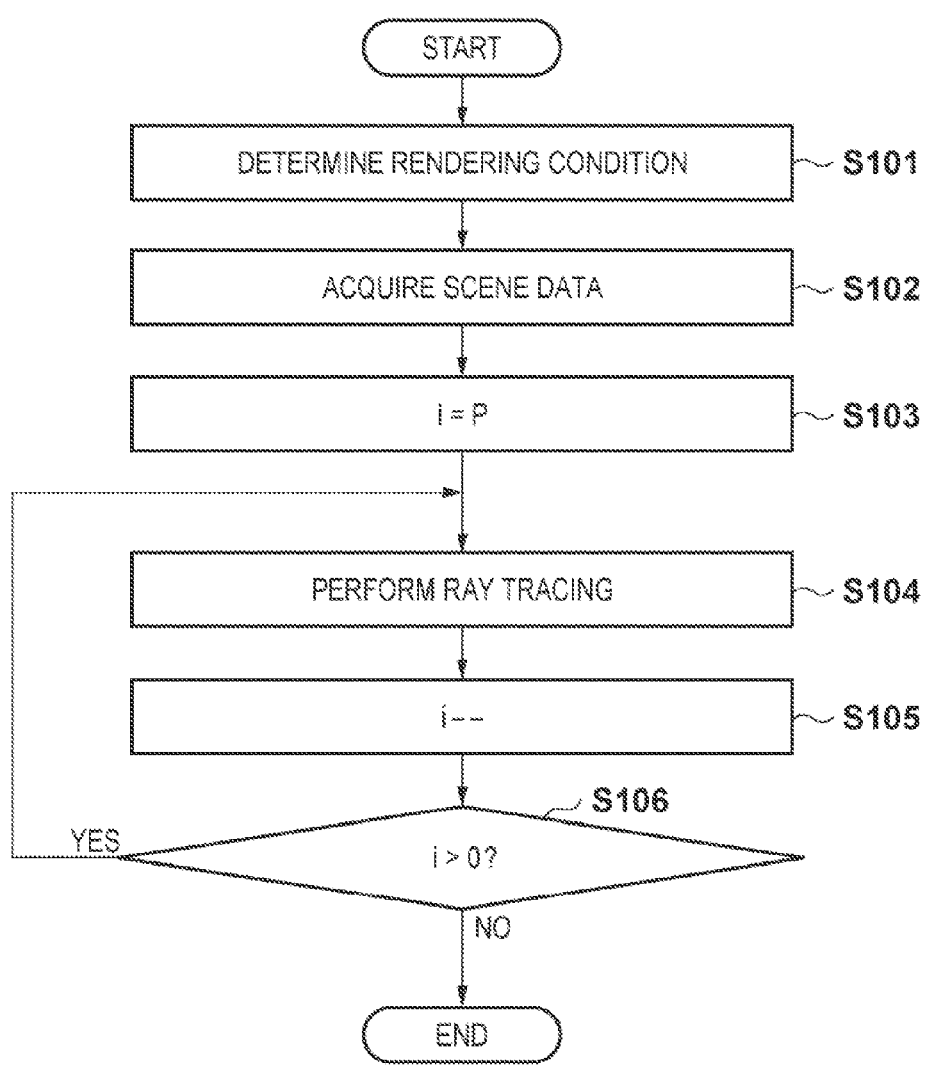
FIG. 5 is a flowchart for explaining image generation processing (rendering processing) in the first embodiment.

Image generation processing (rendering processing) according to the first embodiment will be described with reference to the flowchart of FIG. 5. Note that image generation processing is the processing executed by the CPU 101 in accordance with user instructions.

The CPU 101 sets a rendering size (pixel count), the front clip surface 202, and the rear clip surface 203 as rendering conditions in accordance with user instructions (S101). In this case, the rendering size is P pixels.

The CPU 101 then acquires scene data such as view point data, light source data, and object data (S102). Note that the CPU 101 sets scene data in accordance with user instructions or read scene data from the HDD 108 or the like in accordance with user instructions. View point data is constituted by the view point position 201, a line-of-sight direction, and a field angle (viewing angle 204).

The light source data is constituted by the spectral radiance of the light source 302 and the position of the light source 302 in a virtual space. Different types of light sources differ in spectral radiances and appearance of the color of an object. Therefore, the spectral radiance of the light source is important for the faithful reproduction of a scene.

The object data is constituted by the number of objects located in the virtual space, the positions and shapes of the respective objects, a spectral refractive index (refractive property), a spectral transmittance (transmission property), a spectral reflectance (reflectance property), and a grating constant. Note that the grating constant corresponds to the interval between the grooves of the diffraction grating, which is 0 when there is no diffracting grating which produces structural colors.

The CPU 101 sets the rendering size P in a counter i (S103), and executes processing by the ray-tracing method (S104). The details of this processing by the ray-tracing method will be described later. When the processing by the ray-tracing method is complete, the CPU 101 decrements the counter i (S105), and determines the count value of the counter i (S106). If the count value is i>0, the process returns to step S104. If i=0, the CPU 101 terminates the processing upon determining that the processing by the ray-tracing method is complete for the rendering size.

Processing by Ray-Tracing Method

Figure 6:
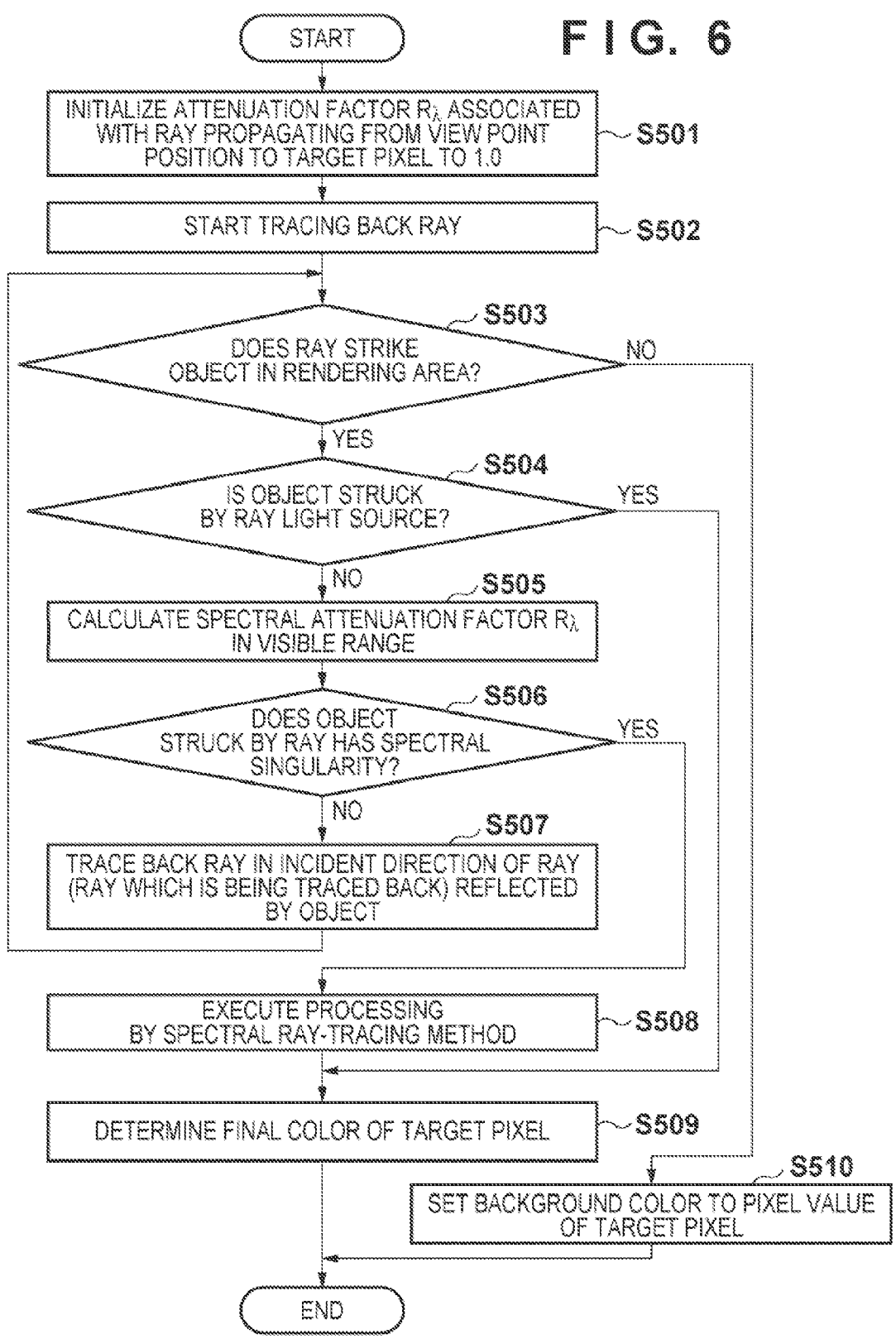
FIG. 6 is a flowchart for explaining processing by the ray-tracing method.

Processing (S104) by the ray-tracing method will be described with reference to the flowchart of FIG. 6.

The CPU 101 initializes the spectral attenuation factor $R_\lambda$ to 1.0, which is stored in a predetermined area of the RAM 102 in association with a ray propagating from the view point position 201 to a pixel (to be referred to as a target pixel hereinafter) corresponding to the count value of the counter i (S501). The CPU 101 then starts tracing back the ray (S502).

Then the CPU 101 determines whether the ray strikes an object in the rendering area 205 (S503). If the ray strikes no object, the process advances to step S510.

The CPU 101 determines whether the object struck by the ray is the light source 302 (whether the ray has reached the light source 302) (S504) if the ray strikes an object. If the ray has reached the light source 302, the process advances to step S509.

If the object struck by the ray is other than the light source 302, the CPU 101 calculates the spectral attenuation factor $R_\lambda$ (S505). That is, the CPU 101 acquires the spectral reflectance $k_\lambda$ and spectral transmittance $T_k$ of the object struck by the ray in the visible range (for example, $\lambda$=380 nm to 780 nm), and multiplies the spectral attenuation factor $R_\lambda$ associated with the ray by each of them. That is, the processing time required for processing for one ray is shortened as compared with the case in which the spectral attenuation factor $R_\lambda$ in the wavelength range in the visible range is calculated, and the ray is traced back for each wavelength.

The CPU 101 then determines whether the object struck by the ray has a spectral singularity (S506). If the object has a spectral singularity, the process advances to step S508. If the object has a spectral singularity, it exhibits the transmission property shown in FIG. 4B, produces the structural colors shown in FIGS. 4C and 4D, and exhibits optical path differences between rays with the respective wavelengths. This allows to determine the presence/absence of a spectral singularity from the refractive property, transmission property, and grating constant by referring to the object data of the object struck by the ray.

If the object struck by the ray has no spectral singularity, the CPU 101 determines the incident direction of the ray reflected by the object (the ray which is being traced back), and traces back the ray in the direction (S507). The process then returns to step S503 to continue tracing back the ray.

In addition, in processing after the object having a spectral singularity (processing after object), which will be described in detail later, the CPU 101 traces back a ray along each of paths divided for each wavelength $\lambda$, that is, executes processing by the spectral ray-tracing method (S508).

When the ray has reached the light source 302 or the processing by the spectral ray-tracing method is complete, the CPU 101 determines the final color of the target pixel (S509). Note that R, G, and B values are used for the final color of the pixel. The CPU 101 calculates the spectral radiance of light in the visible range which enters the target pixel according to the following equation:

$$I_\lambda = R_\lambda \times L_\lambda, \quad (7)$$

The CPU 101 converts the spectral radiance obtained by the above equation into X, Y, and Z values, and then calculates R, G, and B values from the X, Y, and Z values, thereby setting the obtained values as the pixel value of the target pixel.

$$X = k\int I(\lambda)\bar{x}(\lambda)d\lambda$$
$$Y = k\int I(\lambda)\bar{y}(\lambda)d\lambda$$
$$Z = k\int I(\lambda)\bar{z}(\lambda)d\lambda \quad (8)$$

where $k = 100/\int I(\lambda)\bar{y}(\lambda)d\lambda$, and $\bar{x}(\lambda)$, $\bar{y}(\lambda)$, and $\bar{z}(\lambda)$ are color matching functions.

$$\begin{bmatrix} R \\ G \\ B \end{bmatrix} = \begin{bmatrix} a11 & a12 & a13 \\ a21 & a22 & a23 \\ a31 & a32 & a33 \end{bmatrix} \begin{bmatrix} X \\ Y \\ Z \end{bmatrix} \quad (9)$$

When the ray strikes no object or strikes an object but does not reach the light source 302, the CPU 101 sets R, G, and B values (for example, RGB=(0, 0, 0)) of a background color to the pixel value of the target pixel (S510).

Processing by Spectral Ray-Tracing Method

Figure 7:
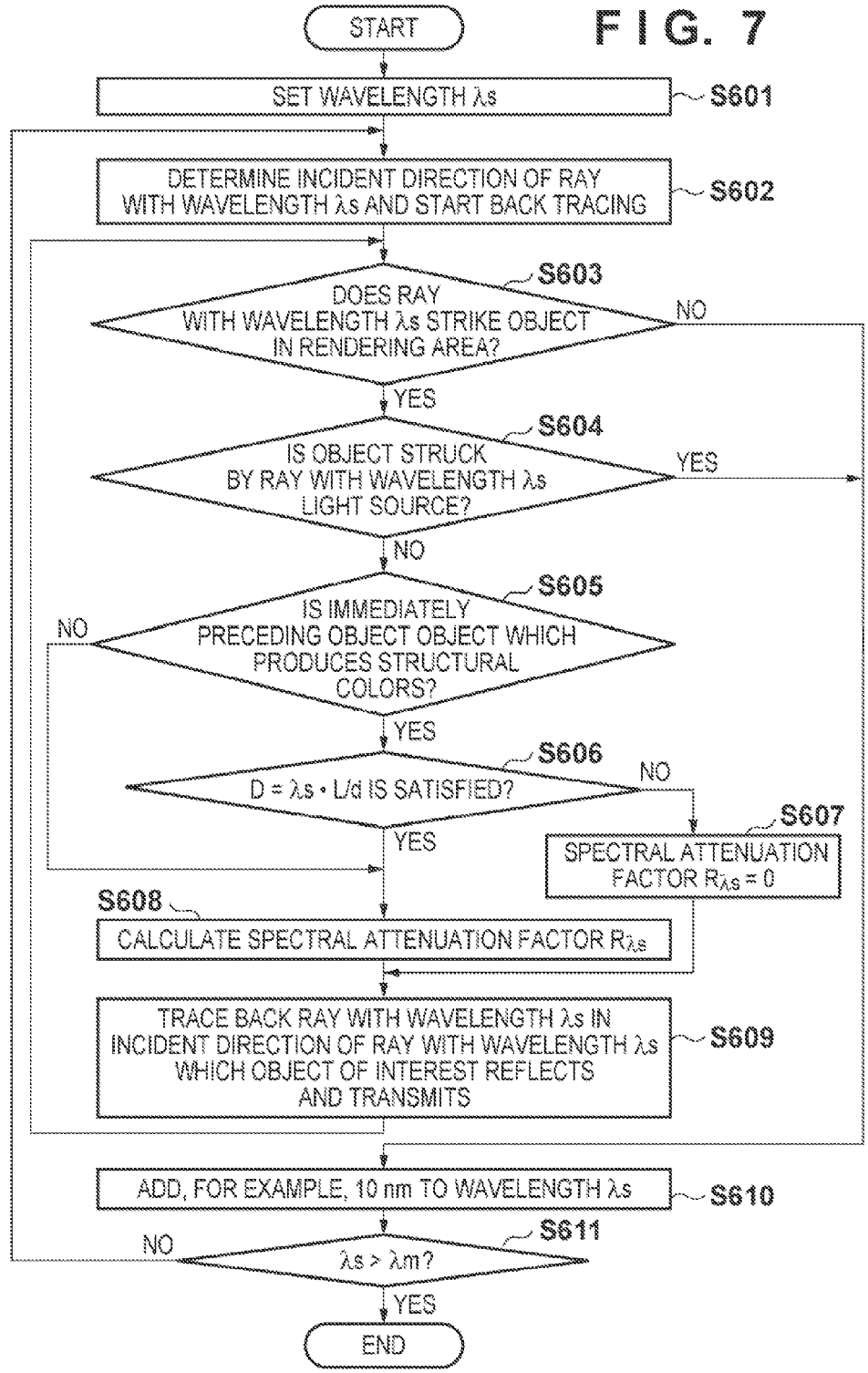
FIG. 7 is a flowchart for explaining processing by the spectral ray-tracing method.

Processing (S508) by the spectral ray-tracing method will be described with reference to the flowchart of FIG. 7. Note that the CPU 101 starts tracing back a ray from an object (to be referred to as a spectral tracing start object hereinafter) determined as an object struck by the ray and having a spectral singularity. The following expression "sets a wavelength $\lambda o$ to a wavelength $\lambda s$" means that a wavelength band with a band of 10 nm and an index (corresponding to $\lambda o$) of 380 nm is set as the wavelength $\lambda s$. Likewise, the expression "adds, for example, 10 nm to the wavelength $\lambda s$" means that, for example, a band of 10 nm is added to an index of wavelength to set a wavelength band with an index of 390 nm in place of a wavelength band with an index of 380 nm.

The CPU 101 sets, for example, the shortest wavelength (for example, 380 nm) in the visible range as the wavelength $\lambda s$ (S601), and then starts back tracing upon determining the incident direction of a wavelength $\lambda s$ component of a ray which is being traced back at the spectral tracing start object (S602). The CPU 101 determines whether the ray with the wavelength $\lambda s$ strikes an object in the rendering area 205 (S603). If the ray strikes no object, the process advances to step S610.

When the ray with the wavelength $\lambda s$ strikes an object, the CPU 101 determines whether the object (to be referred to as the object of interest hereinafter) struck by the ray with the wavelength $\lambda s$ is the light source 302 (whether the ray has reached the light source 302) (S604). If the ray has reached the light source 302, the process advances to step S610.

If the object of interest is other than the light source 302, the CPU 101 determines whether the object (to be referred to as the immediately preceding object hereinafter) struck by the ray with the wavelength $\lambda s$ before the object of interest is an object which produces structural colors (S605). If the immediately preceding object is an object which produces structural colors, the CPU 101 determines whether a distance L between the position on the object of interest at which the ray with wavelength λs has struck and the position on the immediately preceding object at which the ray with the wavelength λs has struck satisfies the condition of period D=λs·L/d (S606). If the distance L does not satisfy the condition, the CPU 101 sets a spectral attenuation factor $R_{\lambda_s}$ to 0 (S607).

If the immediately preceding object is not an object which produces structural colors or the distance L satisfies the above condition associated with the period D, the CPU 101 calculates the spectral attenuation factor $R_{\lambda_s}$ (S608). That is, the CPU 101 acquires a spectral reflectance $k_{\lambda_s}$ and spectral transmittance $T_{\lambda_s}$ of the object of interest at the wavelength λs, and multiplies the spectral attenuation factor $R_{\lambda_s}$ associated with the ray with the wavelength λs by them.

The CPU 101 then determines the incident direction of the ray with the wavelength λs (the ray with the wavelength λs which is being traced back) which the object of interest reflects/transmits, and traces back the ray with the wavelength λs in the direction (S609). The process returns to step S603 to continue tracing back the ray with the wavelength λs.

When the ray with the wavelength λs strikes no object or reaches the light source 302, the CPU 101 adds a predetermined value (for example, 10 nm) as the wavelength λs (S610). The CPU 101 then compares the wavelength λs with, for example, a longest wavelength λm (for example, 740 nm) in the visible range (S611). If λs≤λm, the process returns to step S602 to continue tracing back the ray with the wavelength λs. If λs>λm, the CPU 101 terminates the processing by the spectral ray-tracing method.

When the CPU 101 starts the processing (first tracing) by the ray-tracing method in this manner, and a ray strikes an object having a spectral singularity, the CPU 101 performs processing (second tracing) by the spectral ray-tracing method. If, therefore, there is an object having a spectral singularity in the rendering area, it is possible to obtain a rendering result closer to reality. In addition, since this method traces back one ray unless it strikes any object having a spectral singularity, it is possible to minimize the time required for rendering processing.

Second Embodiment

Image processing according to the second embodiment of the present invention will be described below. The same reference numerals as in the first embodiment denote the same constituent elements in the second embodiment, and a detailed description of them will be omitted.

The second embodiment will exemplify a method of controlling the processing of tracing back a ray in accordance with the distance between a view point 201 and an object. An outline of processing by the ray-tracing method according to the second embodiment will be described with reference to FIGS. 8A and 8B.

Figure 8A:
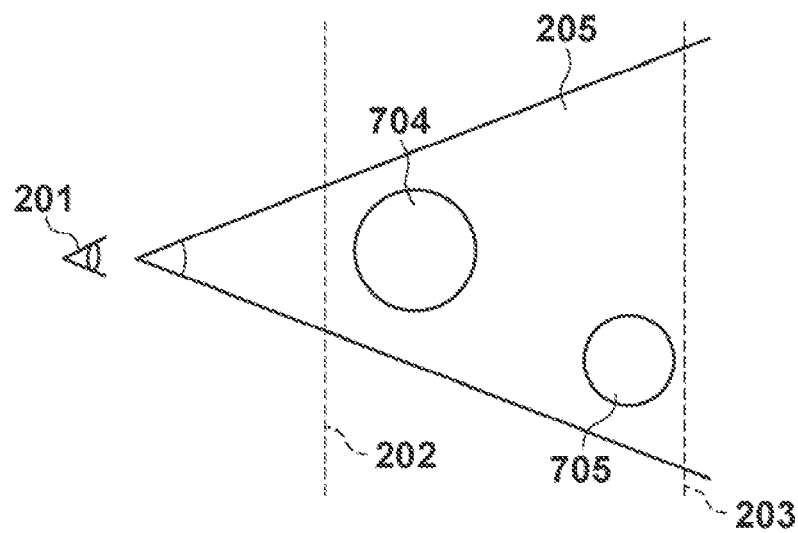
FIGS. 8A and 8B are views for explaining an outline of processing by the ray-tracing method in the second embodiment.

FIG. 8A shows a state in which there are objects 704 and 705 in a rendering area 205 viewed from the view point 201. The object 704 is located close to a front clip surface 202, that is, located close to the view point 201, whereas the object 705 is located close to a rear clip surface 203, that is, located far from the view point 201.

Figure 8B:
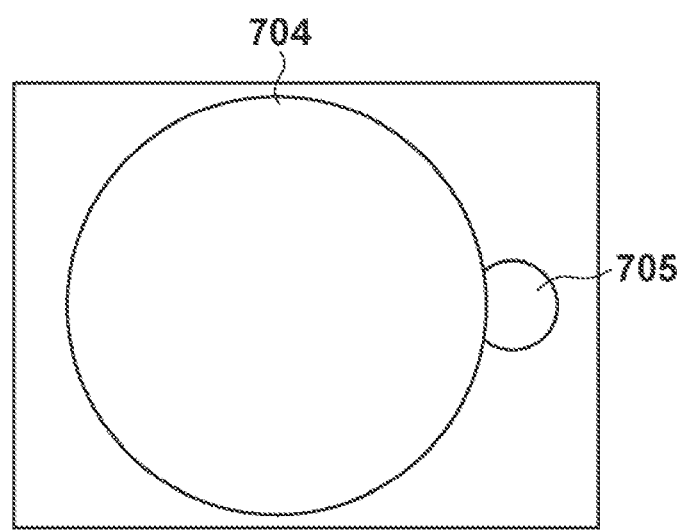

FIG. 8B shows the rendering result on the objects 704 and 705 shown in FIG. 8A. The object 704 occupies a very large area of the rendering result and has a serious influence on the rendering result. The object 705 occupies a very small area of the rendering result, and some part of it is hidden by the object 704. In other words, the object 705 does not greatly influence the rendering result, and hence a deterioration in the rendering quality of the object 705 is not noticeable.

Considering the situation shown in FIG. 8A, detailed processing (for example, the processing in the first embodiment) is effective for an object close to the view point 201, whereas the processing for an object far from the view point 201 can be simplified. The second embodiment therefore switches rendering methods depending on the distance between the view point 201 and an object.

Figure 10:
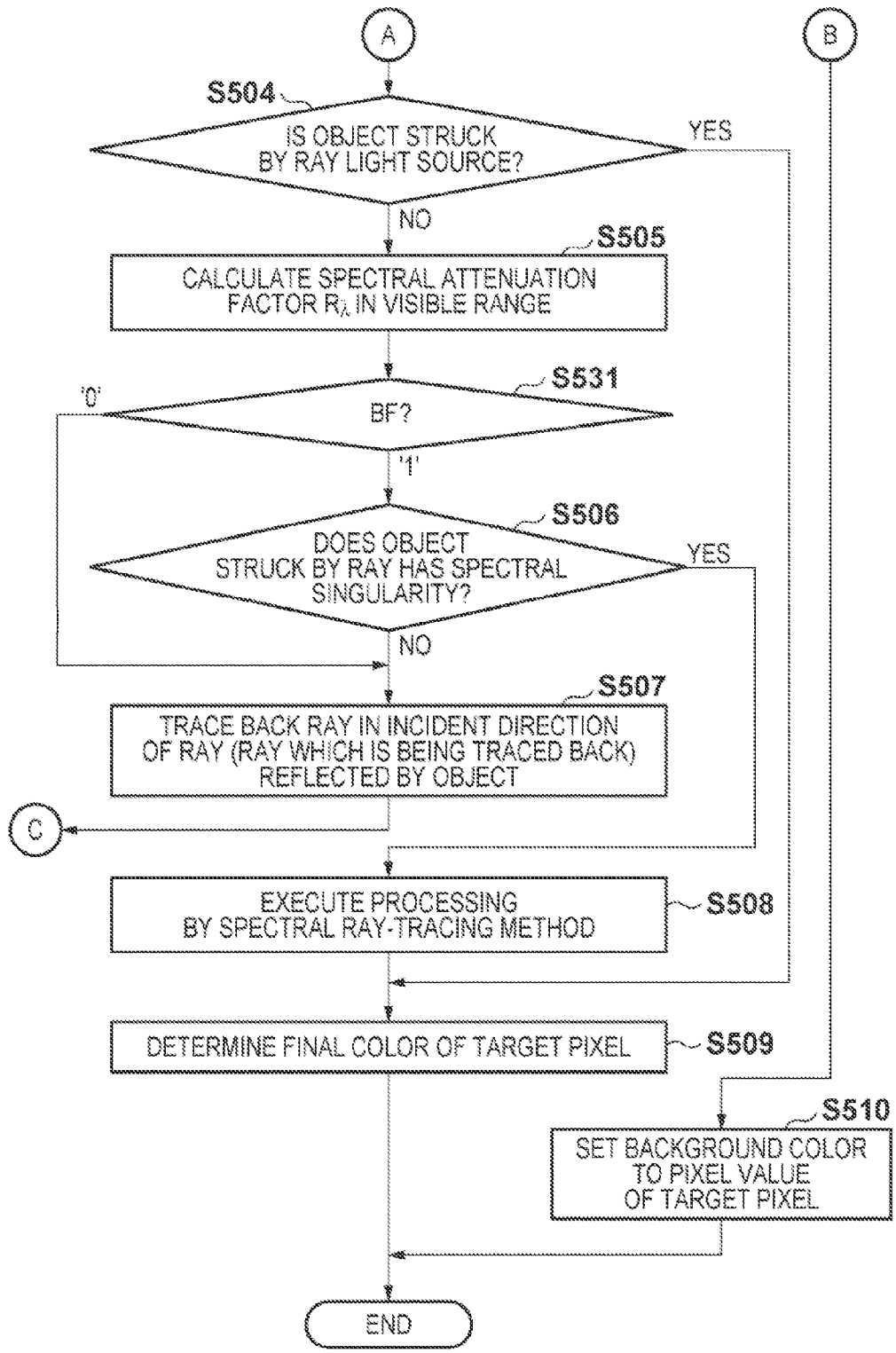

Processing (S104) by the ray-tracing method according to the second embodiment will be described with reference to the flowcharts of FIGS. 9 and 10. The same step numbers denote the same processes as those in FIG. 6, and a detailed description of them will be omitted.

Upon determining in step S503 that the ray strikes an object, a CPU 101 determines whether the object is the object (to be referred to as the first object hereinafter) struck by the ray for the first time after the start of back-tracing of the ray (S521). If the object is not the first object, the process advances to step S504. If the object is the first object, the CPU 101 calculates a distance Do between the view point 201 and the first object, and compares the distance Do with a predetermined distance Dth (S522). If the distance is less than the predetermined distance (Do<Dth), the CPU 101 sets "1" to a flag BF (S523). If the distance is equal to or more than the predetermined distance (Do≥Dth), the CPU 101 sets "0" to the flag BF (S524).

As in the first embodiment, the CPU 101 then performs the processing in steps S504 and S505, and determines the flag BF (S531). If BF="0", the process advances to step S507. If BF="1", the CPU 101 determines whether the object struck by the ray has a spectral singularity (S506), as in the first embodiment. That is, if the distance between the view point 201 and the first object having a spectral singularity is less than the predetermined distance (Do<Dth), the CPU 101 executes the processing (second processing) by the spectral ray-tracing method. Otherwise, the CPU 101 continues the processing (first processing) by the ray-tracing method.

According to this processing, if the first object has a spectral singularity and the distance from the view point 201 is less than the distance Dth, the CPU 101 executes the second processing after the first object. If the first object has no spectral singularity, or the distance from the view point 201 is equal to or more than the distance Dth, the CPU 101 simplifies the processing (continues the first processing) to speed up the rendering processing, regarding that the object does not greatly influence a rendering result.

The above description is an example of alternative control, that is, an example of how to determine, in accordance with the distance Do between the view point 201 and the object, whether to perform the processing (second processing) by the spectral ray-tracing method. For example, it is also possible to provide a plurality of distance thresholds and dynamically control a wavelength step width in accordance with the distance Do so as to perform processing (second processing) by the spectral ray-tracing method.

```
if (Do < Dth1){
    wavelength step width = S1;
    second processing (S508) is executed;
}
if (Dth1 ≤ Do < Dth2){
    wavelength step width = S2;
    second processing (S508) is executed;
}
if (Dth2 ≤ Do)
    first processing is continued;          ... (10)
``` where Dth1<Dth2, and S1<S2 (for example, S1=10 nm and S2=50 nm).

Third Embodiment

Image processing according to the third embodiment of the present invention will be described below. The same reference numerals as in the first and second embodiments denote the same constituent elements in the third embodiment, and a detailed description of them will be omitted.

The third embodiment will exemplify a method of controlling the processing of tracing back a ray in accordance with the number of times of diffused reflection. An outline of the processing by the ray-tracing method according to the third embodiment will be described with reference to FIGS. 11A and 11B.

FIG. 11A shows the behavior of reflection by an object 908 having many fine recesses and projections on the surface. When incident light 906 strikes the object 908, the incident light 906 is scattered by the fine recesses and projections on the surface to generate reflected light 907 in every direction. Diffused reflection is a phenomenon that occurs on a lusterless object, which includes materials such as paper, cloth, skin, and rubber.

FIG. 11B shows the behavior of light when diffused reflection occurs a plurality of number of times. A ray from a light source 902 holds a spectrum and strikes an object 903 having a transmission property. The object 903 functions like a prism, and scatters incident light for each wavelength. A ray with each wavelength which is transmitted through the object 903 strikes a wall 904 as an object which diffuses light. Rays with the respective wavelengths are diffused/reflected by the wall 904 in all directions.

Consider incident light at a given point 909 on a wall 905. Rays with various wavelengths reflected by the wall 904 strike the point 909 altogether. That is, it can be thought that rays which are transmitted through the object 903 having a transmission property and temporarily scattered merge again at the point 909.

In consideration of the above, when rays are diffused/reflected two or more times consecutively, the effect of reproducing rainbow colors is canceled out. This allows to trace back one ray. If, however, the wall 904 is close to the wall 905, the differences in intensity between rays with the respective wavelengths will generate rainbow colors. For this reason, the distance between objects which diffuse light is important. Obviously, since the intensity of light is attenuated in proportion to the distance the light propagates, the differences in intensity can be neglected at a given distance or more.

Processing (S104) by the ray-tracing method according to the third embodiment will be described with reference to the flowcharts of FIGS. 12 and 13. The same reference numerals as in FIGS. 6, 9, and 10 denote the same constituent elements, and a detailed description of them will be omitted.

First of all, a CPU 101 initializes a counter DN which counts the number of times of diffused reflection to 0, and a flag BNF to "0" (S541). Subsequently, the CPU 101 starts processing after step S501.

If a ray strikes an object and the object (to be referred to as the object of interest hereinafter) struck by the ray is other than the light source 902, the CPU 101 calculates a spectral transmittance $R_\lambda$ (S505), and then determines the flag BNF (S551). If BNF="0", the CPU 101 determines whether the object of interest is an object which diffuses light (S552). If the object is an object which does not diffuse light, the CPU 101 initializes the counter DN to 0 (S553). The process advances to step S506. If flag BNF="1", the CPU 101 advances the process to step S507.

If the object of interest is an object which diffuses light, the CPU 101 increments the counter DN (S554), and determines whether the count value of the counter DN is 2 or more (DN≥2) (S555). That is, the CPU 101 determines whether flag BNF "0" and the ray has struck twice or more consecutively objects which diffuse light. If DN≥2, the CPU 101 calculates a distance Db between the object of interest and the immediately preceding object struck by the ray, and compares the distance Db with a predetermined distance Dbth (S556). If Db≥Dbth, the CPU 101 sets the flag BNF to "1" (S557). The process advances to step S507. If the count value is less than 2 (DN<2) or Db<Dbth, the process advances to step S506.

That is, if flag BNF="1", the CPU 101 does not perform the second processing. In addition, if flag BNF="0" and the object of interest has a spectral singularity, the CPU 101 executes the second processing after the object of interest.

In this manner, the CPU 101 controls the first processing and the second processing in accordance with the number of times of diffused reflection of a ray and the distance between objects which diffuse light, thereby speeding up the rendering processing.

Fourth Embodiment

Image processing according to the fourth embodiment of the present invention will be described next. The same reference numerals as in the first to third embodiments denote the same constituent elements in the fourth embodiment, and a detailed description of them will be omitted.

The fourth embodiment will exemplify the processing of performing rendering upon narrowing down spectral wavelengths in accordance with the human visual perception properties in order to increase the processing speed.

The human visual perception properties have peaks at three wavelengths based on the optic nerve structure, and show strong reactions against red (R), green (G), and blue (B). For this reason, color processing often uses the three R, G, and B channels instead of spectra. Likewise, CIEXYZ is sometimes used as channels. Using these channels will degrade the color accuracy as compared with the case of using of spectra. However, since the channels match the human visual perception properties, the difference in color accuracy is difficult to recognize. For this reason, tracing back each ray by using the three R, G, and B channels or CIEXYZ can perform rendering at higher speed while suppressing a degradation in color accuracy of a rendering result because a ray branches into only three rays.

The processing procedure according to the fourth embodiment is almost the same as that in the first to third embodiments. However, in spectral ray-tracing (S508), the fourth embodiment sets $\lambda s=R$, $\lambda s=G$, and $\lambda s=B$ instead of the wavelength $\lambda s$ (for example, 380 nm≤λs≤740 nm). When using the three R, G, and B channels, it is possible to use peak wavelengths (for example, R=605 nm, G=540 nm, and B=445 nm) of the color matching functions as Xs of determination conditions D=λs·L/d in step S606. In addition, each pixel value is expressed by $$I_\lambda = R_\lambda \times L_\lambda \qquad (11)$$

where λ=R, G, and B.

Note that in equation (11), $R_R$, $R_G$, and $R_R$ represent attenuation factors in the respective channels, and hence will be referred to as "channel attenuation factors" in correspondence with spectral attenuation factors.

Fifth Embodiment

Image processing according to the fifth embodiment of the present invention will be described below. The same reference numerals as in the first to fourth embodiments denote the same constituent elements in the fifth embodiment, and a detailed description of them will be omitted.

It is possible to use both spectra and RGB (or CIEXYZ) in spectral ray-tracing (S508). Consider, for example, the scene shown in FIG. 8A as a rendering scene. In this scene, objects 704 and 705 differ in the degree of influence on a rendering result. With regard to the object 704 close to a view point 201, spectral ray-tracing is performed by using spectra. With regard to the object 705 far from the view point 201, simple ray-tracing is performed by using, for example, RGB.

Spectral ray-tracing in the fifth embodiment will be described with reference to the flowchart of FIG. 14. The same step numbers denote the same processes as those in FIG. 7, and a detailed description of them will be omitted.

The CPU 101 calculates a distance Do between an object having a spectral singularity and the view point 201, and compares the distance Do with a predetermined distance Dth3 (S621). If the distance is less than the predetermined distance (Do<Dth3), the CPU 101 sets, for example, the shortest wavelength (for example, 380 nm) in the visible range as a wavelength λs (S601), as in the first embodiment. If the distance is equal to or more than the predetermined distance (Do≥Dth3), the CPU 101 sets a channel (for example, R) as λs (S622), and executes steps S602 to S609.

Upon determining that a ray with λs strikes no object (S603) or an object struck by the ray with λs is a light source (S604), the CPU 101 compares the distance Do with the predetermined distance Dth3 again (S623). If Do<Dth3, the CPU 101 adds a predetermined value (for example, 10 nm) to the wavelength λs (S610), and compares the wavelength λs with, for example, a longest wavelength λm (for example, 740 nm) in the visible range (S611), as in the first embodiment. If λs≤λm, the process returns to step S602 to continue tracing back the ray with the wavelength λs. If λs>λm, the CPU 101 terminates this processing.

If Do≥Dth3, the CPU 101 determines whether ray-tracing for the G channel has been performed (S624). If this ray-tracing has not been performed, the CPU 101 sets the G channel as λs (S625), and returns the process to step S602. Upon performing ray-tracing for the G channel, the CPU 101 determines whether ray-tracing has been performed for the B channel (S626). If this ray-tracing has not been performed, the CPU 101 sets the B channel as λs (S627), and returns the process to step S602.

In this manner, the CPU 101 switches between spectral ray-tracing by spectra and spectral ray-tracing by the three R, G, and B channels or CIEXYZ depending on the degree of influence of the distance Do on a rendering result. As a result, the CPU 101 performs spectral ray-tracing by spectra for an object which is close to a view point and has a large influence on a rendering result, thereby obtaining a rendering result with higher color accuracy than when performing spectral ray-tracing by spectra. On the other hand, the CPU 101 performs spectral ray-tracing by using the three R, G, and B channels for an object which is located far from the view point and has a small influence on a rendering result. This processing makes each ray branch into only three rays, and hence performs rendering at high speed.

The above has described the method of selecting between spectra and R, G, and B (or CIEXYZ) channels. It is, however, possible to dynamically change the number of rays to be traced back (in other words, the number of wavelengths λs or the step width of the wavelength λs in step S610) in accordance with the distance Do between a view point and an object. That is, the CPU 101 increase the step width of the wavelength λs and decreases the number of rays to be traced back (the number of wavelength bands; the number of entities to be described later) with an increase in the distance Do.

Sixth Embodiment

Image processing according to the sixth embodiment of the present invention will be described below. The same reference numerals as in the first to fifth embodiments denote the same constituent elements in the sixth embodiment, and a detailed description of them will be omitted.

Figure 15:
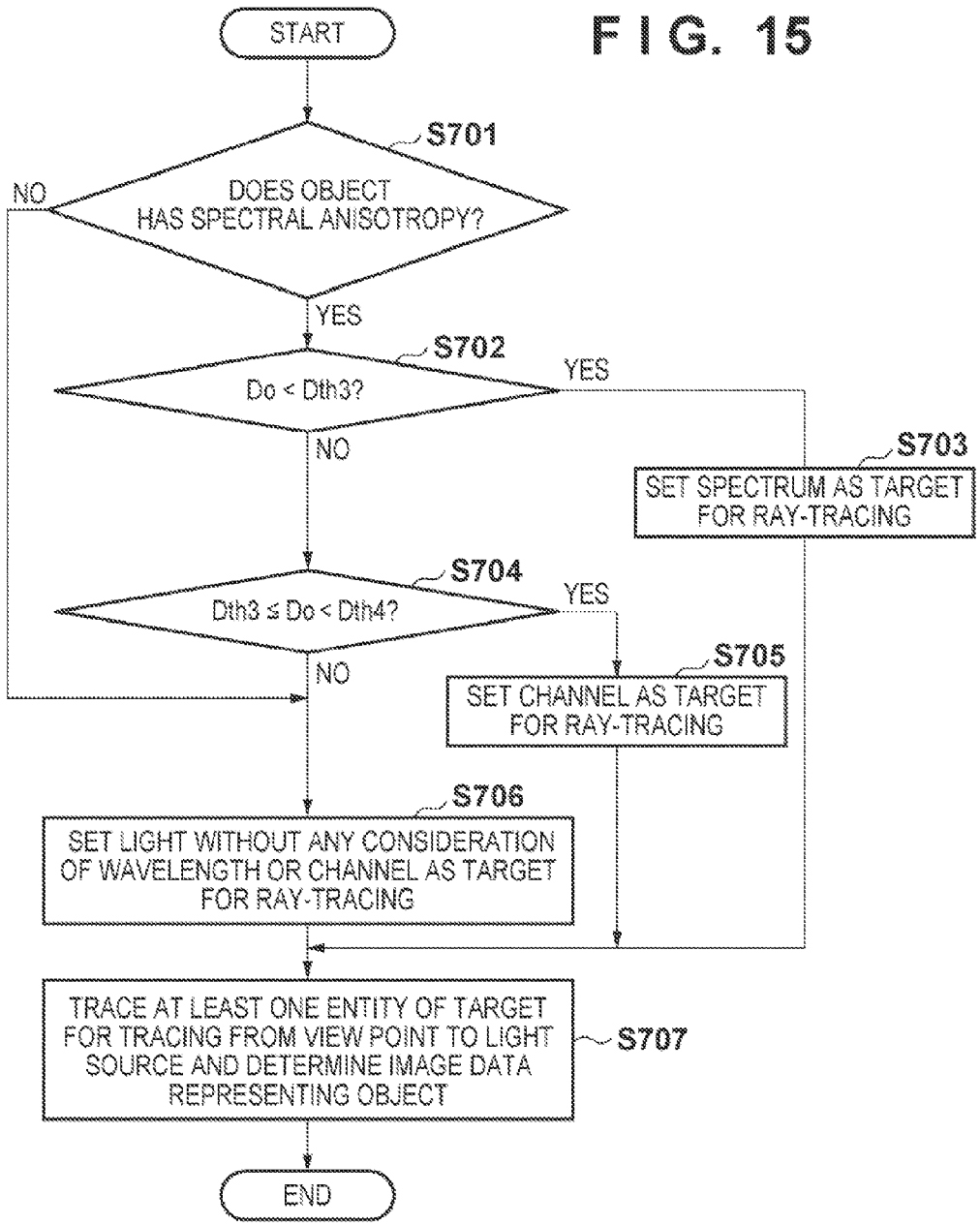
FIG. 15 is a flowchart for explaining the ray-tracing method in the sixth embodiment.

The arrangement of the sixth embodiment (to be described next) is obtained by combining the above embodiments. A ray-tracing method according to the sixth embodiment will be described with reference to the flowchart of FIG. 15. It is however easy to understand the processing in each step from the description of the embodiments, and hence a detailed description of the processing will be omitted.

The CPU 101 determines, based on at least the refractive property and/or reflectance property of the object, whether an object in a virtual three-dimensional space has a spectral anisotropy (S701). If the object has no spectral anisotropy, the CPU 101 determines, as a target for ray-tracing, light without any consideration of a wavelength or channel (S706). If the object has a spectral anisotropy, the CPU 101 determines, as a target for ray-tracing, light, a spectrum, channel, or light without any consideration of wavelength or channel according to the following algorithm (S702 to S706).

```
if (Do < Dth3)
    spectrum is used upon anisotropic
    branching;
if (Dth3 ≤ Do < Dth4)
    channel (for example, RGB) is used upon
    anisotropic branching;
if (Dth4 ≤ Do)
    light is used without anisotropic
    branching;                        ... (12)
```

The CPU 101 then determines image data presenting the object by tracing at least one entity of a target for tracing from a view point in a virtual three-dimensional space to a light source (S707). Note that light includes light itself as an entity, spectra include a plurality of wavelength bands as entities, and channels include a plurality of channels as entities. That is, when light is a target for tracing, normal ray-tracing is performed. If a target for tracing is a spectroscopy or channels, spectral ray-tracing is performed for each wavelength band or channel.

In addition, it is possible to, for example, empirically set the first distance Dth3 and the second distance Dth4 as thresholds. If the distance between an object having a spectral singularity and a view point is less than the first distance (Do<Dth3), the CPU 101 sets, as a target for tracing, a spectrum upon anisotropic branching. If the distance is equal to or more than the first distance (Do≥Dth3) and is less than the second distance (Do<Dth4), the CPU 101 sets, as a target for tracing, a channel upon anisotropic branching. If the distance is equal to or more than the second distance (Do≥Dth4), the CPU 101 sets, as a target for tracing, light without anisotropic branching.

Note that the term "light" means a ray having information of a plurality of wavelengths (channel); the term "spectra" means a bundle of a plurality of rays, each of which has information of a wavelength; and the term "channels" means a bundle of a plurality of rays, each of which has information of a channel.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions This application claims the benefit of Japanese Patent Applications No. 2011-026530, filed Feb. 9, 2011, and No. 2012-006555, filed Jan. 16, 2012 which are hereby incorporated by reference herein in their entirety.

What is claimed is:

1. An image processing apparatus for generating image data representing at least one object in a virtual three-dimensional space using a ray-tracing method, the apparatus comprising:
   a first determiner configured to determine whether or not light to be traced strikes an object;
   a second determiner configured to determine, in a case where it is determined that the light strikes the object, a distance between the object and a view point in the virtual three-dimensional space so as to determine whether light or a plurality of entities of spectral light are to be used as a target for tracing by the ray-tracing method; and
   a third determiner configured to determine a pixel value of image data representing the object by tracing the target for tracing, determined by the second determiner, from the view point to a light source in the virtual three-dimensional space,
   wherein the second determiner determines the plurality of entities of spectral light as the target for tracing between the object and the view point, in a case where the distance is less than a first distance, (a) the target for tracing comprises a ray of one of a plurality of channels based on visual perception properties in a first case where the distance is less than the first distance and not less than a second distance, (b) the target for tracing comprises a ray of a single wavelength in a second case where the distance is less than the second distance, and (c) the second determiner determines the light as the target for tracing between the object and the view point, in a third case where the distance is not less than the first distance,
   wherein the third determiner calculates an attenuation factor of light in a path of the tracing in the third case, calculates a spectral attenuation factor in a path of the tracing in the second case, calculates a channel attenuation factor in a path of the tracing in the first case, and determines a pixel value of image data representing the object using those attenuation factors, and
   wherein the first to third determiners are implemented using a processor.

2. An image processing apparatus for generating image data representing at least one object in a virtual three-dimensional space using a ray-tracing method, the apparatus comprising:
   a first determiner configured to determine light to be traced strikes an object;
   a second determiner configured to determine, in a case where it is determined that the light strikes the object, whether or not the object diffuses light;
   a counter configured to count a number of times the light has consecutively struck another object which diffuses light;
   a third determiner configured to determine whether the light or a plurality of entities of spectral light are to be used as a target of tracing between a view point and an object which has a spectral singularity, based on the number of times counted by the counter;
   a fourth determiner configured to determine a pixel value of image data representing the object by tracing the target for tracing, determined by the third determiner, from the view point to a light source in the virtual three-dimensional space; and
   a calculator configured to calculate, in a case where the light strikes the object which diffuses light, a distance between the object and the other object, which diffuses light, struck by the light before the light reaches the object,
   wherein the third determiner determines the light as the target for tracing in a case where the count value is not less than 2 and the distance is not less than a predetermined distance, and
   wherein the first to fourth determiners, the counter, and the calculator are implemented using a processor.

3. An image processing method of generating image data representing at least one object in a virtual three-dimensional space using a ray-tracing method, the method comprising:
   using a processor to perform:
   a first determination step of determining whether or not light to be traced strikes an object;
   a second determination step of determining, in a case where it is determined that the light strikes the object, a distance between the object and a view point in the virtual three-dimensional space so as to determine whether the light or a plurality of entities of spectral light are to be used as a target for tracing by the ray-tracing method; and
   a third determination step of determining a pixel value of image data representing the object by tracing the target for tracing, determined in the second determination step, from the view point to a light source in the virtual three-dimensional space,
   wherein, in the second determination step, the plurality of entities of spectral light are determined as the target for tracing between the object and the view point, in a case where the distance is less than a first distance, (a) the target for tracing comprises a ray of one of a plurality of channels based on visual perception properties in a first case where the distance is less than the first distance and not less than a second distance, (b) the target for tracing comprises a ray of a single wavelength in a second case where the distance is less than the second distance, and (c) the light is determined as the target for tracing between the object and the view point, in a third case where the distance is not less than the first distance, and
   wherein, in the third determination step, an attenuation factor of light in a path of the tracing is calculated in the third case, a spectral attenuation factor in a path of the tracing is calculated in the second case, a channel attenuation factor in a path of the tracing is calculated in the first case, and a pixel value of image data representing the object is determined using those attenuation factors.

4. An image processing method of generating image data representing at least one object in a virtual three-dimensional space using a ray-tracing method, the method comprising:
   using a processor to perform:
   a first determination step of determining light to be traced strikes an object;
   a second determination step of determining, in a case where it is determined that the light strikes the object, whether or not the object diffuses light;
   a counting step of counting a number of times the light has consecutively struck another object which diffuses light;
   a third determination step of determining whether the light or a plurality of entities of spectral light are to be used as a target of tracing between a view point and an object which has a spectral singularity, based on the number of times counted in the counting step;
   a fourth determination step of determining a pixel value of image data representing the object by tracing the target for tracing, determined in the third determination step, from the view point to a light source in the virtual three-dimensional space; and
   a calculation step of calculating, in a case where the light strikes the object which diffuses light, a distance between the object and the other object, which diffuses light, struck by the light before the light reaches the object,
   wherein, in the third determination step, the light is determined as the target for tracing in a case where the count value is not less than 2 and the distance is not less than a predetermined distance.

5. A non-transitory computer readable medium storing a computer-executable program for causing a computer to perform a method of generating image data representing at least one object in a virtual three-dimensional space using a ray-tracing method, the method comprising:
   a first determination step of determining whether or not light to be traced strikes an object;
   a second determination step of determining, in a case where it is determined that the light strikes the object, a distance between the object and a view point in the virtual three-dimensional space so as to determine whether the light or a plurality of entities of spectral light are to be used as a target for tracing by the ray-tracing method; and
   a third determination step of determining a pixel value of image data representing the object by tracing the target for tracing, determined in the second determination step, from the view point to a light source in the virtual three-dimensional space,
   wherein, in the second determination step, the plurality of entities of spectral light are determined as the target for tracing between the object and the view point, in a case where the distance is less than a first distance, (a) the target for tracing comprises a ray of one of a plurality of channels based on visual perception properties in a first case where the distance is less than the first distance and not less than a second distance, (b) the target for tracing comprises a ray of a single wavelength in a second case where the distance is less than the second distance, and (c) the light is determined as the target for tracing between the object and the view point, in a third case where the distance is not less than the first distance, and
   wherein, in the third determination step, an attenuation factor of light in a path of the tracing is calculated in the third case, a spectral attenuation factor in a path of the tracing is calculated in the second case, a channel attenuation factor in a path of the tracing is calculated in the first case, and a pixel value of image data representing the object is determined using those attenuation factors.

6. A non-transitory computer readable medium storing a computer-executable program for causing a computer to perform a method of generating image data representing at least one object in a virtual three-dimensional space using a ray-tracing method, the method comprising:
   a first determination step of determining light to be traced strikes an object;
   a second determination step of determining, in a case where it is determined that the light strikes the object, whether or not the object diffuses light;
   a counting step of counting a number of times the light has consecutively struck another object which diffuses light;
   a third determination step of determining whether the light or a plurality of entities of spectral light are to be used as a target of tracing between a view point and an object which has a spectral singularity, based on the number of times counted in the counting step;
   a fourth determination step of determining a pixel value of image data representing the object by tracing the target for tracing, determined in the third determination step, from the view point to a light source in the virtual three-dimensional space; and
   a calculation step of calculating, in a case where the light strikes the object which diffuses light, a distance between the object and the other object, which diffuses light, struck by the light before the light reaches the object,
   wherein, in the third determination step, the light is determined as the target for tracing in a case where the count value is not less than 2 and the distance is not less than a predetermined distance.

* * * * *